United States Patent
Lee et al.

(10) Patent No.: US 11,743,764 B2
(45) Date of Patent: Aug. 29, 2023

(54) METHOD FOR SELECTING BWP AND DEVICE SUPPORTING THE SAME

(71) Applicant: LG ELECTRONICS INC., Seoul (KR)

(72) Inventors: Youngdae Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/253,098

(22) PCT Filed: Jun. 20, 2019

(86) PCT No.: PCT/KR2019/007439
§ 371 (c)(1),
(2) Date: Dec. 16, 2020

(87) PCT Pub. No.: WO2019/245297
PCT Pub. Date: Dec. 26, 2019

(65) Prior Publication Data
US 2021/0274377 A1 Sep. 2, 2021

Related U.S. Application Data

(60) Provisional application No. 62/687,757, filed on Jun. 20, 2018.

(51) Int. Cl.
*H04L 12/24* (2006.01)
*H04W 28/02* (2009.01)
(Continued)

(52) U.S. Cl.
CPC ..... *H04W 28/0289* (2013.01); *H04L 41/0896* (2013.01); *H04W 74/0808* (2013.01); *H04W 74/0833* (2013.01)

(58) Field of Classification Search
CPC . H04L 5/0001; H04L 5/0098; H04L 41/0896; H04W 28/0289; H04W 72/0453;
(Continued)

(56) References Cited

U.S. PATENT DOCUMENTS

2018/0279358 A1\* 9/2018 Babaei ............... H04W 72/14
2019/0103954 A1\* 4/2019 Lee ..................... H04L 5/001
(Continued)

FOREIGN PATENT DOCUMENTS

WO 2018062957 4/2018

OTHER PUBLICATIONS

PCT International Application No. PCT/KR2019/007439, International Search Report dated Sep. 30, 2019, 2 pages.
(Continued)

*Primary Examiner* — Alpus Hsu
(74) *Attorney, Agent, or Firm* — Lee Hong Degerman Kang Waimey

(57) ABSTRACT

Provided are a method of selecting BWP and a device supporting the method. According to one embodiment of the present invention, the method includes: configuring multiple bandwidth parts (BWPs) for a cell; activating a first BWP among the multiple BWPs; acquiring information on congestion of at least one of the multiple BWPs; and switching to a second BWP among the multiple BWPs from the first BWPs, based on the acquired information on congestion.

8 Claims, 13 Drawing Sheets

(51) Int. Cl.
*H04W 74/08* (2009.01)
*H04L 41/0896* (2022.01)

(58) Field of Classification Search
CPC ........... H04W 72/085; H04W 74/0808; H04W 74/0833
See application file for complete search history.

(56) References Cited

U.S. PATENT DOCUMENTS

| | | | | |
|---|---|---|---|---|
| 2019/0132857 A1* | 5/2019 | Babaei | .............. | H04W 72/1252 |
| 2019/0132862 A1* | 5/2019 | Jeon | ................ | H04L 5/001 |
| 2019/0149305 A1* | 5/2019 | Zhou | .................... | H04L 5/0007 370/330 |
| 2019/0182675 A1* | 6/2019 | Pu | ........................ | H04W 48/12 |
| 2019/0190681 A1* | 6/2019 | Li | ......................... | H04W 76/34 |
| 2019/0215869 A1* | 7/2019 | Lin | ........................ | H04L 5/001 |
| 2019/0222290 A1* | 7/2019 | Ly | ......................... | H04L 5/0048 |
| 2019/0253230 A1* | 8/2019 | Loehr | ................. | H04W 72/042 |
| 2019/0254110 A1* | 8/2019 | He | ...................... | H04L 41/0896 |
| 2019/0306867 A1* | 10/2019 | Cirik | ................. | H04W 74/0833 |
| 2019/0313411 A1* | 10/2019 | Ly | ...................... | H04W 72/0453 |
| 2019/0313437 A1* | 10/2019 | Jung | .................. | H04W 72/0453 |
| 2019/0335508 A1* | 10/2019 | Agiwal | ................. | H04W 48/14 |
| 2019/0349983 A1* | 11/2019 | Loehr | .................. | H04W 52/242 |
| 2019/0357085 A1* | 11/2019 | Chervyakov | ......... | H04L 1/0009 |
| 2019/0357261 A1* | 11/2019 | Cirik | ..................... | H04W 74/02 |
| 2019/0394776 A1* | 12/2019 | Lee | ....................... | H04W 16/14 |
| 2021/0167930 A1* | 6/2021 | Jeon | ..................... | H04L 27/2607 |
| 2021/0336750 A1* | 10/2021 | Zhou | ..................... | H04W 76/28 |

OTHER PUBLICATIONS

Huawei, HiSilicon, "Summary of remaining issues on bandwidth part and wideband operation," 3GPP TSG-RAN WG1 #92, R1-1801347, Feb. 2018, 15 pages.

InterDigital Inc., "BWP operation in unlicensed spectrum," 3GPP TSG-RAN WG1 #92bis, R1-1804680, Apr. 2018, 6 pages.

Huawei, HiSilicon, "BWP operation in NR unlicensed spectrum," 3GPP TSG-RAN WG1 #93, R1-1805923, May 2018, 6 pages.

Sony, "Considerations on channel access for NR unlicensed operations," 3GPP TSG-RAN WG1 #93, R1-1806569, May 2018, 6 pages.

* cited by examiner

METHOD FOR SELECTING BWP AND DEVICE SUPPORTING THE SAME

CROSS-REFERENCE TO RELATED APPLICATIONS

This application is the National Stage filing under 35 U.S.C. 371 of International Application No. PCT/KR2019/007439, filed on Jun. 20, 2019, which claims the benefit of U.S. Provisional Application No. 62/687,757, filed on Jun. 20, 2018, the contents of which are all incorporated by reference herein in their entirety.

TECHNICAL FIELD

The present invention relates to a wireless communication system, and more particularly, to a method for selecting BWP and a device supporting the same.

BACKGROUND

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

In NR, Supplementary Uplink (SUL) is introduced for enhancing UL coverage. In case of SUL, the UE is configured with 2 ULs for one DL of the same cell, and uplink transmissions on those two ULs are controlled by the network to avoid overlapping PUSCH/PUCCH transmissions in time. Overlapping transmissions on PUSCH are avoided through scheduling while overlapping transmissions on PUCCH are avoided through configuration (PUCCH can only be configured for only one of the 2 ULs of the cell).

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

SUMMARY

According to a prior art, when congestion occurs on a particular BWP in unlicensed band, UE cannot move to non-congested BWP by itself without indication on PDCCH or expiry of BWP Inactivity Timer. Further, base station may not quickly know whether congestion occurs in the BWP.

According to an embodiment of the present invention, a method performed by a user equipment (UE) in a wireless communication system is provided. The method may comprise: configuring multiple bandwidth parts (BWPs) for a cell; activating a first BWP among the multiple BWPs; acquiring information on congestion of at least one of the multiple BWPs; and switching to a second BWP among the multiple BWPs from the first BWPs, based on the acquired information on congestion.

The multiple BWPs may be configured on unlicensed band.

The information on congestion of the at least one of the multiple BWPs may include information on congestion of the first BWP.

The information on congestion of the at least one of the multiple BWPs may include information on congestion of the second BWP.

The switching to the second BWP may be performed, when congestion level of the first BWP is above a threshold informed by the cell.

The switching to the second BWP may be performed, when congestion level of the second BWP is below a threshold informed by the cell.

The information on congestion may be acquired by carrier sensing.

The information on congestion may inform whether the at least one of the multiple BWPs is busy or free.

The switching to the second BWP may include considering the second BWP as an initial BWP or a default BWP.

The method may further comprise performing UL transmission on the second BWP via random access procedure.

The UE may communicate with at least one of a mobile terminal, a network or autonomous vehicles other than the UE.

According to another embodiment of the present invention, a user equipment (UE) in a wireless communication system is provided. The UE may comprise: a memory; a transceiver; and a processor, operably coupled to the memory and the transceiver, and configured to: configure multiple bandwidth parts (BWPs) for a cell; activate a first BWP among the multiple BWPs; acquire information on congestion of at least one of the multiple BWPs; and switch to a second BWP among the multiple BWPs from the first BWPs, based on the acquired information on congestion.

The multiple BWPs may be configured on unlicensed band.

The information on congestion of the at least one of the multiple BWPs may include information on congestion of the first BWP.

According to another embodiment of the present invention, a processor for a wireless communication device in a wireless communication system is provided. The processor may be configured to control the wireless communication device to: configure multiple bandwidth parts (BWPs) for a cell; activate a first BWP among the multiple BWPs; acquire information on congestion of at least one of the multiple BWPs; and switch to a second BWP among the multiple BWPs from the first BWPs, based on the acquired information on congestion.

According to embodiments of the present invention, the UE may provide user service on BWP efficiently by moving to non-congested BWP by itself.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
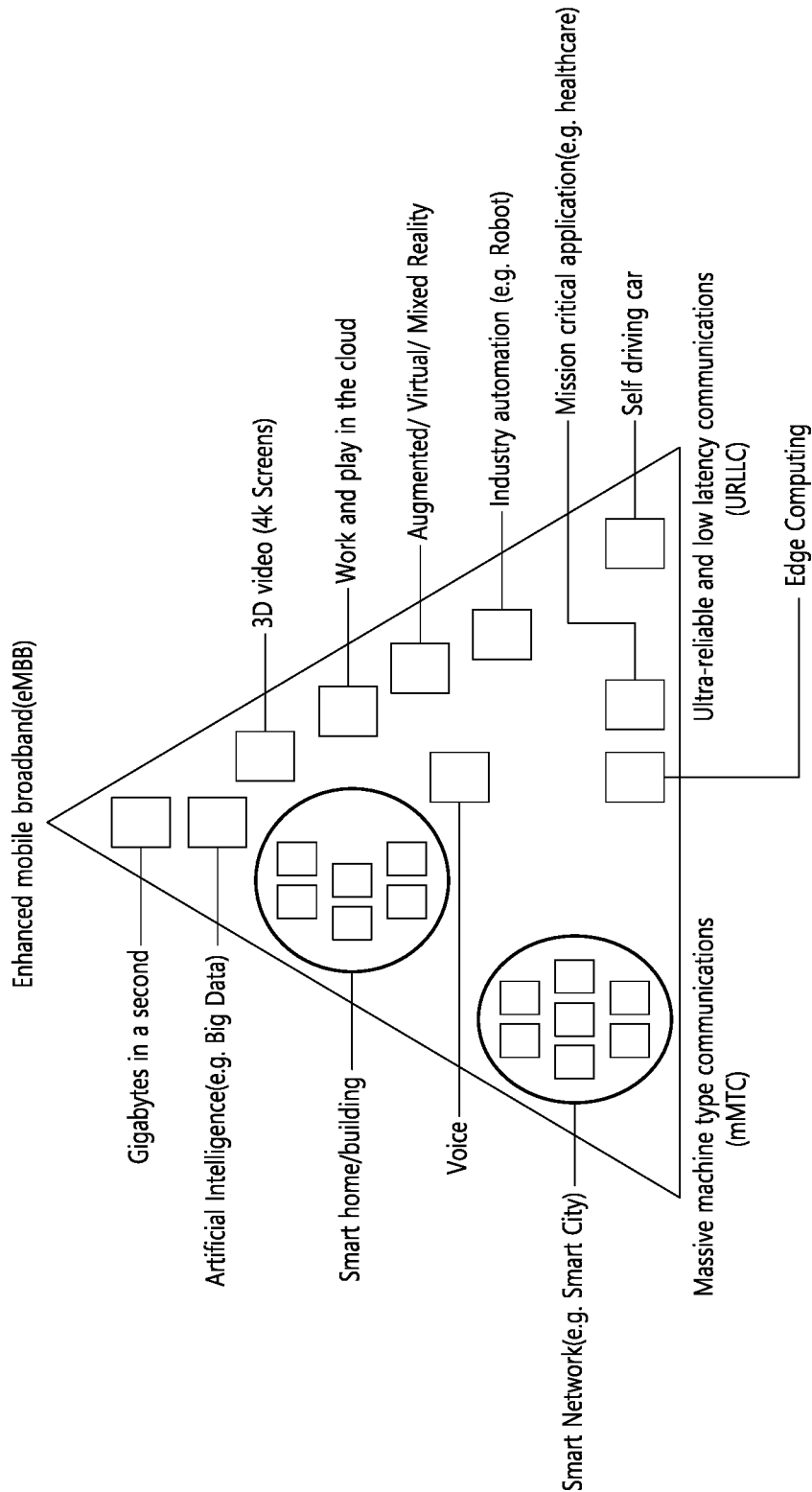
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
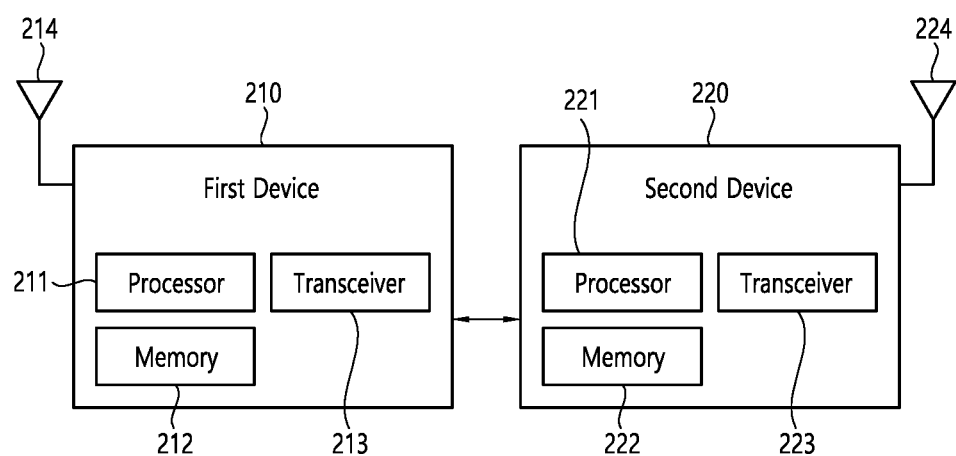
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna.

For example, antenna 214 and/or antenna 224 may be configured to transmit and receive wireless signals.

Figure 3:
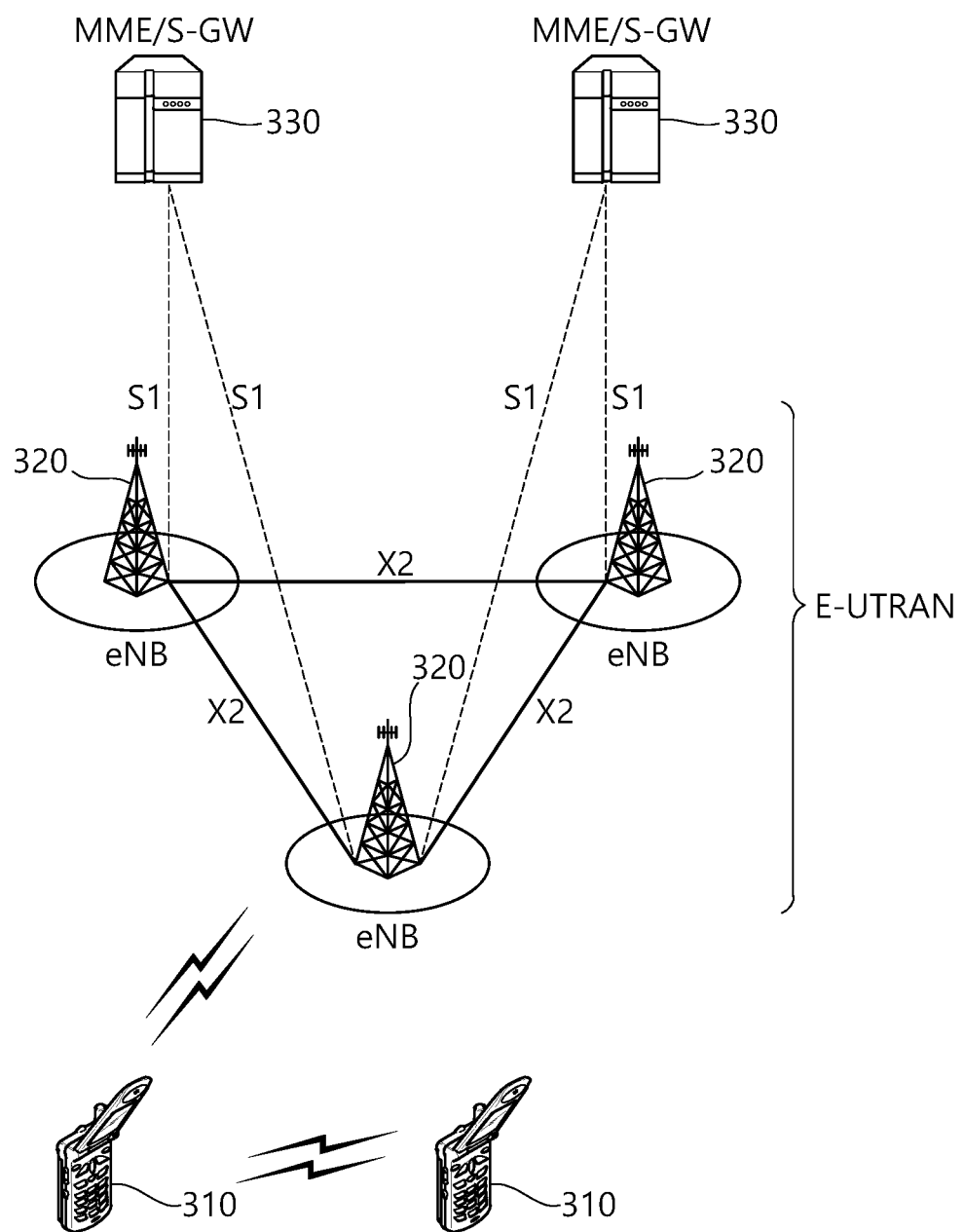
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
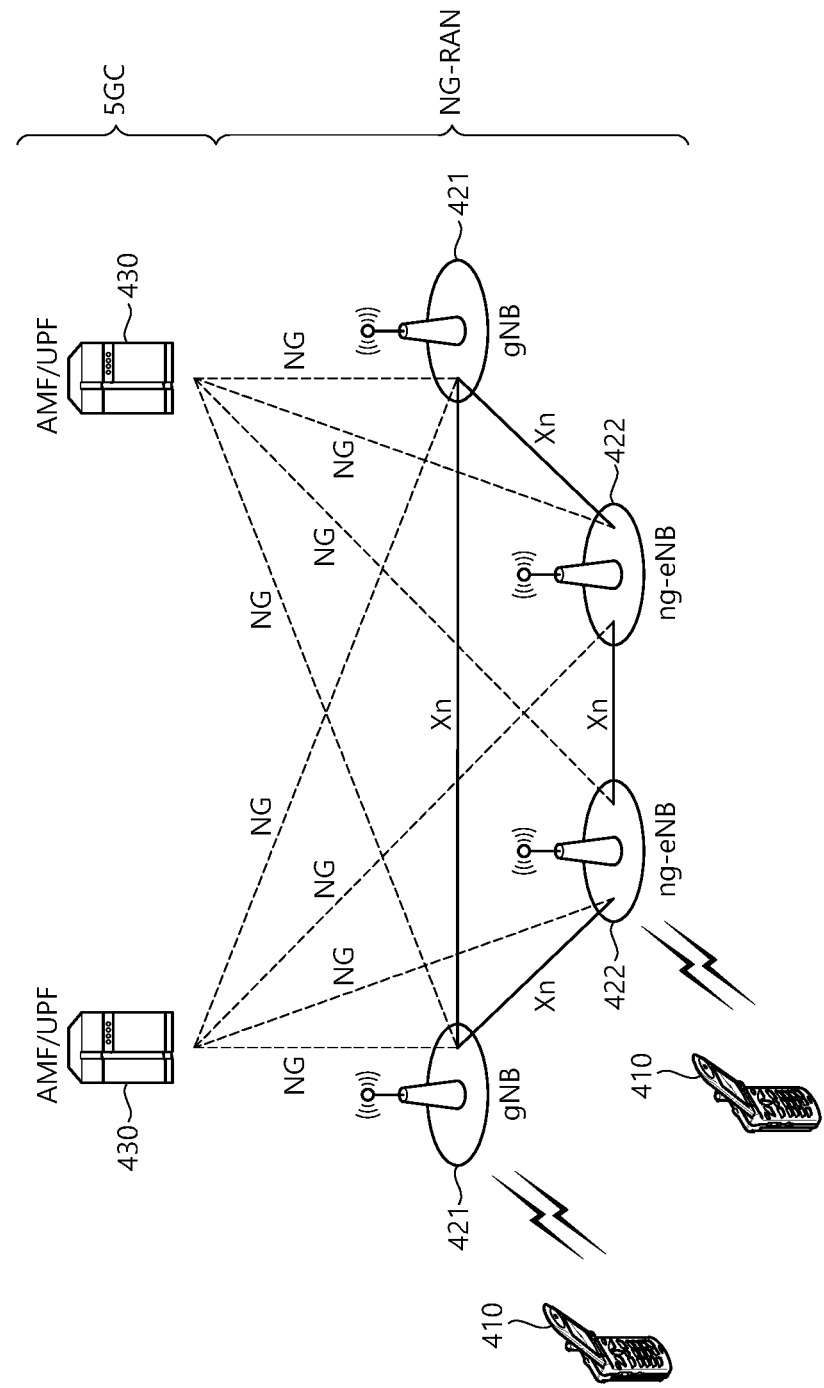
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
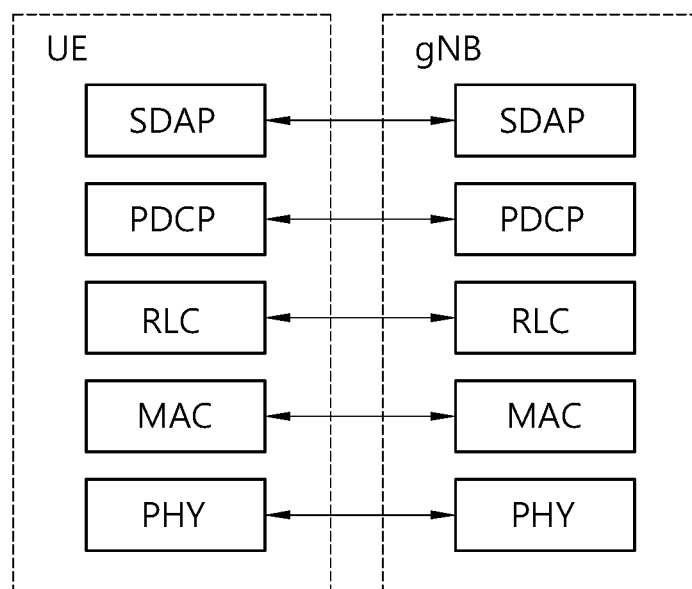
FIG. 5 shows a block diagram of a user plane protocol stack to which the technical features of the present invention can be applied.
Figure 6:
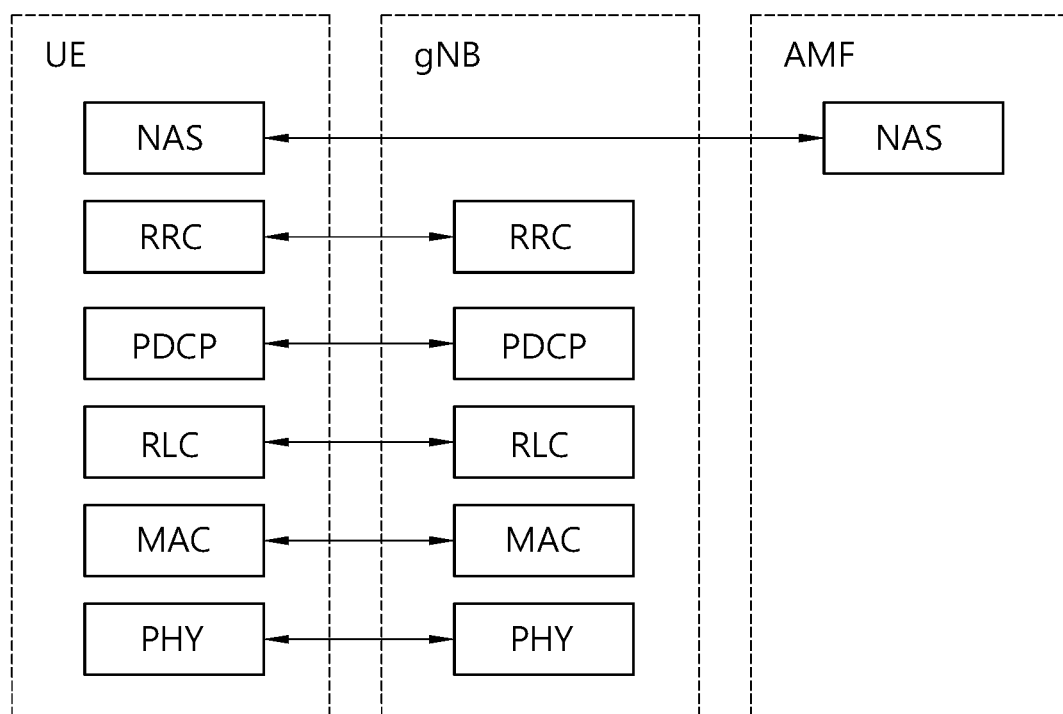
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

In NR, Supplementary Uplink (SUL) is introduced for enhancing UL coverage. In case of SUL, the UE is configured with 2 ULs for one DL of the same cell, and uplink transmissions on those two ULs are controlled by the network to avoid overlapping PUSCH/PUCCH transmissions in time. Overlapping transmissions on PUSCH are avoided through scheduling while overlapping transmissions on PUCCH are avoided through configuration (PUCCH can only be configured for only one of the 2 ULs of the cell). In addition, initial access is supported in each of the uplink. For initial access in a NR cell configured with SUL, the UE may select the SUL carrier if and only if the measured quality of the DL is lower than a broadcast threshold. Once started, all uplink transmissions of the random access procedure remain on the selected carrier.

Figure 7:
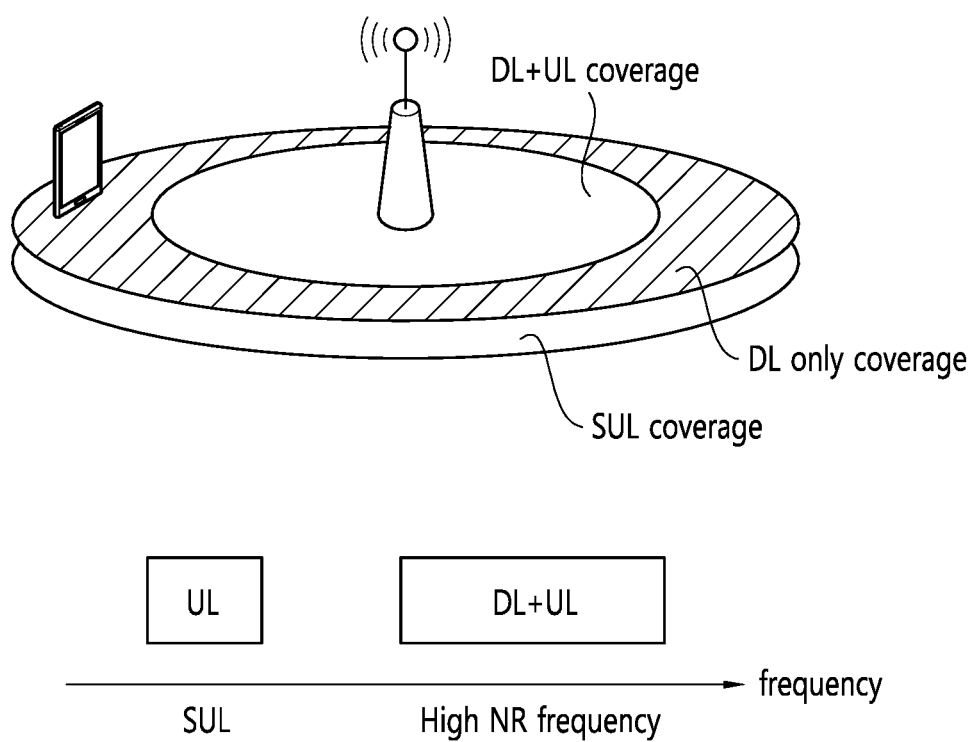
FIG. 7 shows scenarios for SUL.

FIG. 7 shows scenarios for SUL. Referring to FIG. 7, Up to 2 UL carriers are configurable per each DL carrier in a cell. The PUCCH is semi-statically configured between non-SUL and SUL in PCell if SUL is configured. The PUSCH can be dynamically switched between non-SUL and SUL if configured. No simultaneous PUSCH transmission on both is allowed at the same time. SRS can be simultaneously transmitted on both UL carriers. The PDCCH order can indicate which UL to use for RACH transmission. The RACH procedure (contention) can select non-SUL or SUL PRACH resource depending on RSRP.

The SUL carrier can be configured as a complement to the normal UL (NUL) carrier. Switching between the normal carrier and the SUL carrier means that the UL transmissions move from the PUSCH on one carrier to the other carrier. This is done via an indication in DCI. If the MAC entity receives a UL grant indicating a SUL switch while a Random Access procedure is ongoing, the MAC entity shall ignore the UL grant.

The Serving Cell configured with supplementary Uplink belongs to a single TAG.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

Figure 8:
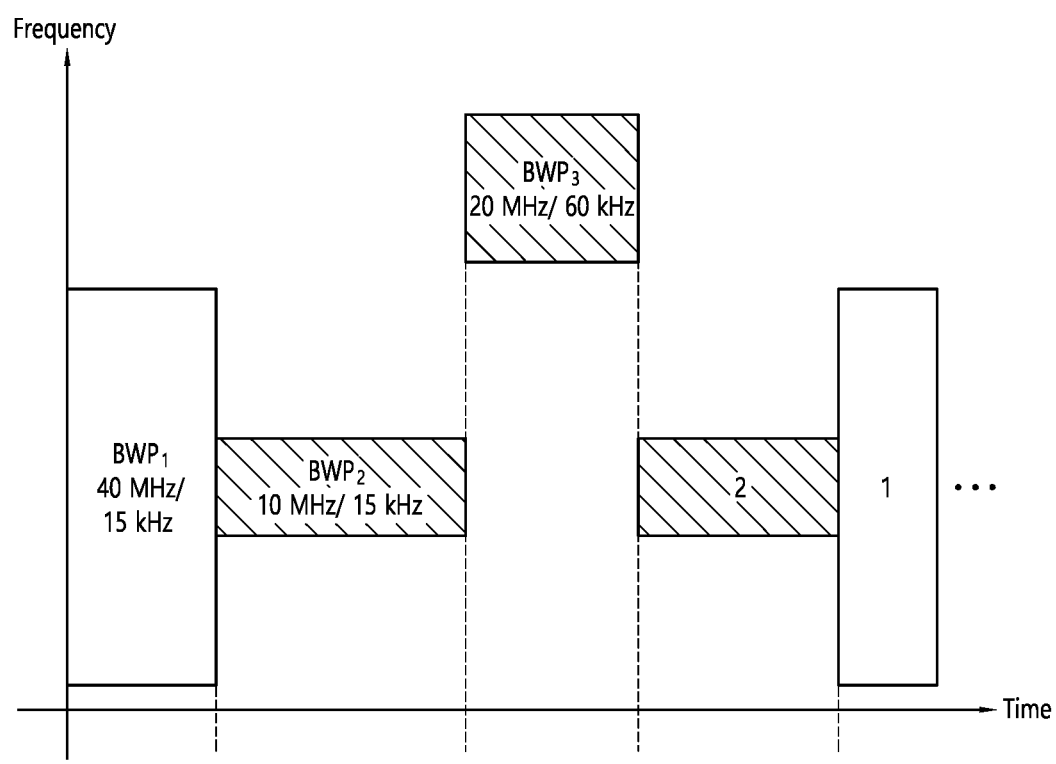
FIG. 8 shows a scenario where 3 different BWPs are configured.

FIG. 8 shows a scenario where 3 different BWPs are configured.

As shown in FIG. 8, BWP1 may be configured with a width of 40 MHz and subcarrier spacing of 15 kHz. BWP2 may be configured with a width of 10 MHz and subcarrier spacing of 15 kHz. BWP3 may be configured with a width of 20 MHz and subcarrier spacing of 60 kHz.

A Serving Cell may be configured with one or multiple BWPs. The BWP switching for a Serving Cell is used to activate an inactive BWP and deactivate an active BWP at a time. The BWP switching is controlled by the PDCCH indicating a downlink assignment or an uplink grant, by the bandwidthPartInactivityTimer, or by the MAC entity itself upon initiation of Random Access procedure. Upon addition of SpCell or activation of a SCell, one BWP is initially active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

On the active BWP for each activated Serving Cell configured with a BWP, the MAC entity shall apply normal operations including:
1> transmit on UL-SCH;
1> transmit on RACH;
1> monitor the PDCCH;
1> transmit PUCCH;
1> transmit SRS;
1> receive DL-SCH;
1> (re-)initialize any suspended configured uplink grants of configured grant Type 1 according to the stored configuration, if any, and to start in the symbol.

On the inactive BWP for each activated Serving Cell configured with a BWP, the MAC entity shall:
1> not transmit on UL-SCH;
1> not transmit on RACH;
1> not monitor the PDCCH;
1> not transmit PUCCH;
1> not transmit SRS;
1> not receive DL-SCH;
1> clear any configured downlink assignment and configured uplink grant of configured grant Type 2;
1> suspend any configured uplink grant of configured Type 1.

Upon initiation of the Random Access procedure, the MAC entity shall:
1> if PRACH occasions are configured for the active UL BWP:
2> perform the Random Access procedure on the active DL BWP and UL BWP.
1> else (i.e. PRACH occasions are not configured for the active UL BWP):
2> switch to initial DL BWP and UL BWP;
2> perform the Random Access procedure on the initial DL BWP and UL BWP.

If the MAC entity receives a PDCCH for BWP switching of a serving cell, the MAC entity shall:
1> if there is no ongoing Random Access procedure associated with this Serving Cell; or
1> if the ongoing Random Access procedure associated with this Serving Cell is successfully completed upon reception of this PDCCH addressed to C-RNTI:
2> perform BWP switching to a BWP indicated by the PDCCH.

If the MAC entity receives a PDCCH for BWP switching while a Random Access procedure is ongoing in the MAC entity, it is up to UE implementation whether to switch BWP or ignore the PDCCH for BWP switching, except for the PDCCH reception for BWP switching addressed to the C-RNTI for successful Random Access procedure completion in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure on the new activated BWP; if the MAC decides to ignore the PDCCH for BWP switching, the MAC entity shall continue with the ongoing Random Access procedure on the active BWP.

If the bwp-InactivityTimer is configured, the MAC entity shall for each activated Serving Cell:
1> if the default-DL-BWP is configured, and the active DL BWP is not the BWP indicated by the default-DL-BWP; or
1> if the default-DL-BWP is not configured, and the active DL BWP is not the initial BWP:
2> if a PDCCH addressed to C-RNTI or CS-RNTI indicating downlink assignment or uplink grant is received on the active BWP; or
2> if a MAC PDU is transmitted in a configured uplink grant or received in a configured downlink assignment:
3> if there is no ongoing random access procedure associated with this Serving Cell; or
3> if the ongoing Random Access procedure associated with this Serving Cell is successfully completed upon reception of this PDCCH addressed to C-RNTI:
4> start or restart the bandwidthPartInactivityTimer associated with the active DL BWP.
2> if a PDCCH for BWP switching is received on the active DL BWP, and the MAC entity switches the active BWP:
3> start or restart the bwp-InactivityTimer associated with the active DL BWP.
2> if Random Access procedure is initiated on this Serving Cell:
3> stop the bwp-InactivityTimer associated with the active DL BWP of this Serving Cell.
3> if the Serving Cell is SCell (other than PSCell):
4> stop the bwp-InactivityTimer associated with the active DL BWP of SpCell, if running.
2> if the bwp-InactivityTimer associated with the active DL BWP expires:
3> if the default-DL-BWP is configured:

4> perform BWP switching to a BWP indicated by the default-DL-BWP.
3> else:
4> perform BWP switching to the initial DL BWP.

NR standalone operation on unlicensed band will be introduced. When congestion occurs on a particular BWP in unlicensed band, UE cannot move to non-congested BWP by itself without indication on PDCCH or expiry of BWP Inactivity Timer. Further, gNB may not quickly know whether congestion occurs in the BWP. Thus, UE may not serve user service on the BWP in congestion.

Figure 9:
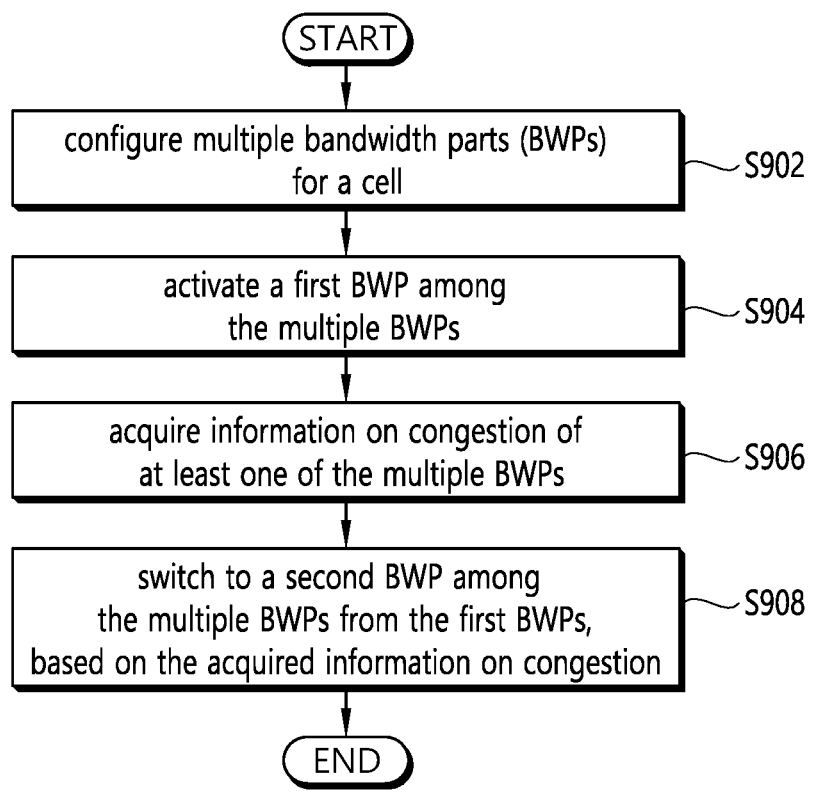
FIG. 9 shows a method for selecting BWP according to an embodiment of the present invention.

FIG. 9 shows a method for selecting BWP according to an embodiment of the present invention.

In step S902, the UE may configure multiple bandwidth parts (BWPs) for a cell. The multiple BWPs may be configured on unlicensed band.

In step S904, the UE may activate a first BWP among the multiple BWPs.

In step S906, the UE may acquire information on congestion of at least one of the multiple BWPs. The information on congestion of the at least one of the multiple BWPs may include information on congestion of the first BWP. The information on congestion of the at least one of the multiple BWPs may include information on congestion of the second BWP. The information on congestion may be acquired by carrier sensing. The information on congestion may inform whether the at least one of the multiple BWPs is busy or free.

In step S908, the UE may switch to a second BWP among the multiple BWPs from the first BWPs, based on the acquired information on congestion. The UE may switch to the second BWP, when congestion level of the first BWP is above a threshold informed by the cell. The UE may switch to the second BWP, when congestion level of the second BWP is below a threshold informed by the cell. The switching to the second BWP may include considering the second BWP as an initial BWP or a default BWP.

Further, the UE may perform UL transmission on the second BWP via random access procedure. The UE may communicate with at least one of a mobile terminal, a network or autonomous vehicles other than the UE.

According to embodiments of the present invention, the UE may provide user service on BWP efficiently by moving to non-congested BWP by itself.

According to an embodiment of the present invention, when UE is configured with multiple uplink Bandwidth Parts (BWPs), if at least one BWP is active, and if the congestion level of the active BWP is above a threshold indicated by the network for a certain time period, the UE may perform BWP switching to another BWP. The switched BWP may be considered as either default BWP or an initial BWP. Then, the UE may perform uplink transmission on the switched BWP via random access procedure or via PUSCH.

When the congestion level of the active BWP is above a threshold indicated by the network for a certain time period, the UE may stop a BWP Inactivity Timer associated with the active BWP and the UE may perform BWP switching to another BWP.

When the congestion level of the active BWP is above a threshold indicated by the network for a certain time period, the UE may perform BWP switching to another BWP and the UE may trigger random access on the switched BWP.

When a condition of the BWP switching to another BWP is met, the UE may perform the BWP switching based on the congestion level of the BWP. For example, when a condition of the BWP switching to other BWP is met, that is, when congestion level of other BWP is below a threshold indicated by the network, the UE may perform the BWP switching to the other BW from a currently activated BWP. Otherwise, UE may not perform the BWP switching to the BWP.

Figure 10:
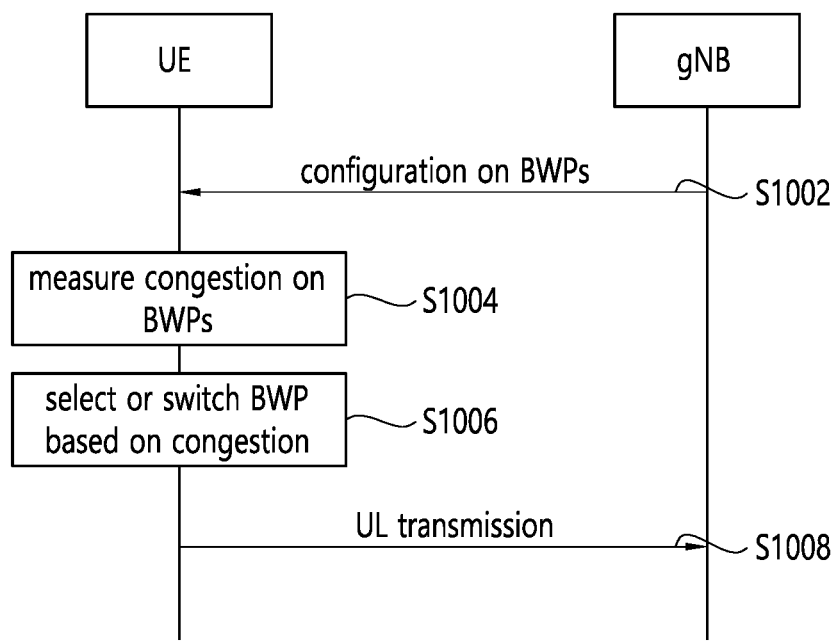
FIG. 10 shows a method for selecting BWP according to an embodiment of the present invention.

FIG. 10 shows a method for selecting BWP according to an embodiment of the present invention.

In step S1002, the UE may receive configuration on at least two BWPs from a cell. The UE may be configured with the at least two BWPs for one DL of a cell according to the configuration. The configuration may be related to addition or activation of serving cell. The BWPs may be overlapped, contiguous or non-contiguous in frequency. All or some of the BWPs may be in either unlicensed band or licensed band. The configuration may include a threshold indicated by the network (i.e. Cong_thres). The UE may be in RRC_IDLE, RRC_INACTIVE or RRC_CONNECTED. The UE may activate at least one BWP among the configured BWPs e.g. by the PDCCH indicating a downlink assignment or an uplink grant or by RRC signaling, and the UE may start a timer associated with the active BWP. The timer may be BWP Inactivity Timer.

Alternatively, the UE may perform addition of SpCell or activation of a SCell. The UE may be configured with more than one BWP for one DL of the cell. The UE may perform step S1006 and S1008 to select a BWP which will be initially active.

In step S1004, the UE may measure congestion level of at least one BWP which is active. The congestion level may include information on quality of the at least one BWP. The congestion level may include information on whether the at least one BWP is occupied by other medium or not. For example, the UE may measure the congestion level of the at least one BWP by carrier sensing, such as LBT operation. In specific, the congestion level may be determined based on result of consecutive LBT operation. That is, the congestion level may be determined based on how many times the LBT failure is detected in series.

Further, the UE may measure congestion level of an inactive BWP. Or, the UE may only measure congestion level of BWPs of which measured quality (e.g. RSRP or RSRQ or RSSI) is above another threshold. Alternatively, the UE may acquire information on congestion level of at least one BWP from a network.

In step S1006, the UE may perform BWP switching to another BWP or may select another BWP based on the congestion level of at least one BWP (and the qualities of BWPs). If default BWP is configured, the switched BWP may be a default BWP. Otherwise, the switched BWP may be an initial BWP. In other words, the UE may consider the switched BWP as the default BWP or the initial BWP. The BWP may be a DL BWP and/or UL BWP.

The UE may stop the timer associated with the active BWP based on the congestion level of at least one BWP (and the qualities of BWPs). The UE may stop the timer associated with the active BWP before or after performing BWP switching to another BWP. Or, UE stops the timer associated with the active BWP before or after selecting another BWP.

For example, if the congestion level of an active BWP is above a threshold indicated by the network (i.e. Cong_thres), the UE may perform BWP switching from the active BWP to another BWP in licensed band or unlicensed band, or selects another BWP.

For example, if the congestion level of an active BWP is above a threshold indicated by the network (i.e. Cong_thres), and if the quality of another BWP is above a threshold indicated by the network, the UE may perform BWP switching from the active BWP to another BWP in licensed band or unlicensed band, or selects another BWP.

For example, if the congestion level of an active BWP is the higher than the congestion level of another BWP, the UE may perform BWP switching from the active BWP to another BWP in licensed band or unlicensed band, or selects another BWP.

For example, if the congestion level of an active BWP is the higher than the congestion level of another BWP, and if the quality of another BWP is above a threshold indicated by the network, the UE may perform BWP switching from the active BWP to another BWP in licensed band or unlicensed band, or selects another BWP.

For example, if the congestion level of other BWP is below a threshold indicated by the network, the UE may perform BWP switching from the active BWP to the other BWP in licensed band or unlicensed band, or selects another BWP.

For example, if the congestion level of other BWP is lowest among congestion levels of all BWPs, the UE may perform BWP switching from the active BWP to the other BWP with the lowest congestion level in licensed band or unlicensed band, or selects the BWP with the lowest congestion level.

For example, if the congestion level of a BWP is lowest among congestion levels of all BWPs, and if the quality of the BWP with the lowest congestion level is above a threshold indicated by the network, the UE may perform BWP switching from the active BWP to the BWP with the lowest congestion level in licensed band or unlicensed band, or selects the BWP with the lowest congestion level.

When UE supports multiple BWPs, if one of the above conditions described above is met, the UE may additionally select another BWP instead of performing BWP switching to another BWP. In other words, the examples for performing BWP switching may be adapted to the BWP selection.

In step S1008, the UE may perform uplink transmission on the switched or selected BWP via random access procedure or via PUSCH. For example, the UE may perform uplink transmission for transmission of a RRC message. For example, the UE may perform uplink transmission via PUSCH for transmission of user data or MAC Control Element.

According to an embodiment of the present invention, the MAC entity of the UE may perform the following procedure:

Upon addition of SpCell or activation of an SCell, the MAC entity shall:
1> if the congestion level of a BWP is lowest among congestion levels of all BWPs for this serving cell; and
1> if the quality of the BWP with the lowest congestion level is above a threshold indicated by the network:
2> selects the BWP with the lowest congestion level;
2> activate the selected BWP;
2> initiate a Random Access procedure on the selected BWP.

Upon initiation of the Random Access procedure, the MAC entity shall:
1> if PRACH occasions are configured for the active UL BWP:
2> perform the Random Access procedure on the active DL BWP and UL BWP.
1> else (i.e. PRACH occasions are not configured for the active UL BWP):
2> switch to initial DL BWP and UL BWP;
2> perform the Random Access procedure on the initial DL BWP and UL BWP.

If the MAC entity receives a PDCCH for BWP switching of a serving cell, the MAC entity shall:

1> if there is no ongoing Random Access procedure associated with this Serving Cell; or
1> if the ongoing Random Access procedure associated with this Serving Cell is successfully completed upon reception of this PDCCH addressed to C-RNTI (as specified in subclauses 5.1.4 and 5.1.5):
2> if congestion level of the BWP indicated by the PDCCH is lower than a threshold indicated by the gNB:
3> perform BWP switching to a BWP indicated by the PDCCH.

If the MAC entity receives a PDCCH for BWP switching while a Random Access procedure is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in subclauses 5.1.4 and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure on the new activated BWP; if the MAC decides to ignore the PDCCH for BWP switching, the MAC entity shall continue with the ongoing Random Access procedure on the active BWP.

If the bwp-InactivityTimer is configured, the MAC entity shall for each activated Serving Cell:
1> if the default-DL-BWP is configured, and the active DL BWP is not the BWP indicated by the default-DL-BWP; or
1> if the default-DL-BWP is not configured, and the active DL BWP is not the initial BWP:
2> if a PDCCH addressed to C-RNTI or CS-RNTI indicating downlink assignment or uplink grant is received on the active BWP; or
2> if a MAC PDU is transmitted in a configured uplink grant or received in a configured downlink assignment:
3> if there is no ongoing random access procedure associated with this Serving Cell; or
3> if the ongoing Random Access procedure associated with this Serving Cell is successfully completed upon reception of this PDCCH addressed to C-RNTI (as specified in subclauses 5.1.4 and 5.1.5):
4> start or restart the bandwidthPartInactivityTimer associated with the active DL BWP.
2> if a PDCCH for BWP switching is received on the active DL BWP, and the MAC entity switches the active BWP:
3> start or restart the bwp-InactivityTimer associated with the active DL BWP.
2> if Random Access procedure is initiated on this Serving Cell:
3> stop the bwp-InactivityTimer associated with the active DL BWP of this Serving Cell.
3> if the Serving Cell is SCell (other than PSCell):
4> stop the bwp-InactivityTimer associated with the active DL BWP of SpCell, if running.
2> if congestion level of the active DL BWP is higher than a threshold indicated by gNB;
3> stop the bwp-InactivityTimer associated with the active DL BWP of this Serving Cell;
3> if the default-DL-BWP is configured:
4> perform BWP switching to a BWP indicated by the default-DL-BWP.
3> else:
4> perform BWP switching to the initial DL BWP.

3> initiate a Random Access procedure on a new activated BWP;
3> if the Serving Cell is SCell (other than PSCell):
4> stop the bwp-InactivityTimer associated with the active DL BWP of SpCell, if running.
2> if congestion level of the active DL BWP is higher than congestion level of a DL BWP (which is inactive); and
2> if congestion level of the (inactive) DL BWP is lowest among congestion levels of all BWPs for this serving cell, or if congestion level of the (inactive) DL BWP is lower than a threshold indicated by gNB;
3> stop the bwp-InactivityTimer associated with the active DL BWP of this Serving Cell;
3> perform BWP switching to the (inactive) DL BWP;
3> initiate a Random Access procedure on a new activated BWP;
3> if the Serving Cell is SCell (other than PSCell):
4> stop the bwp-InactivityTimer associated with the active DL BWP of SpCell, if running.
2> if the bwp-InactivityTimer associated with the active DL BWP expires:
3> if the default-DL-BWP is configured:
4> perform BWP switching to a BWP indicated by the default-DL-BWP.
3> else:
4> perform BWP switching to the initial DL BWP.

According to embodiments of the present invention, the UE may provide user service on BWP efficiently by moving to non-congested BWP by itself.

Figure 11:
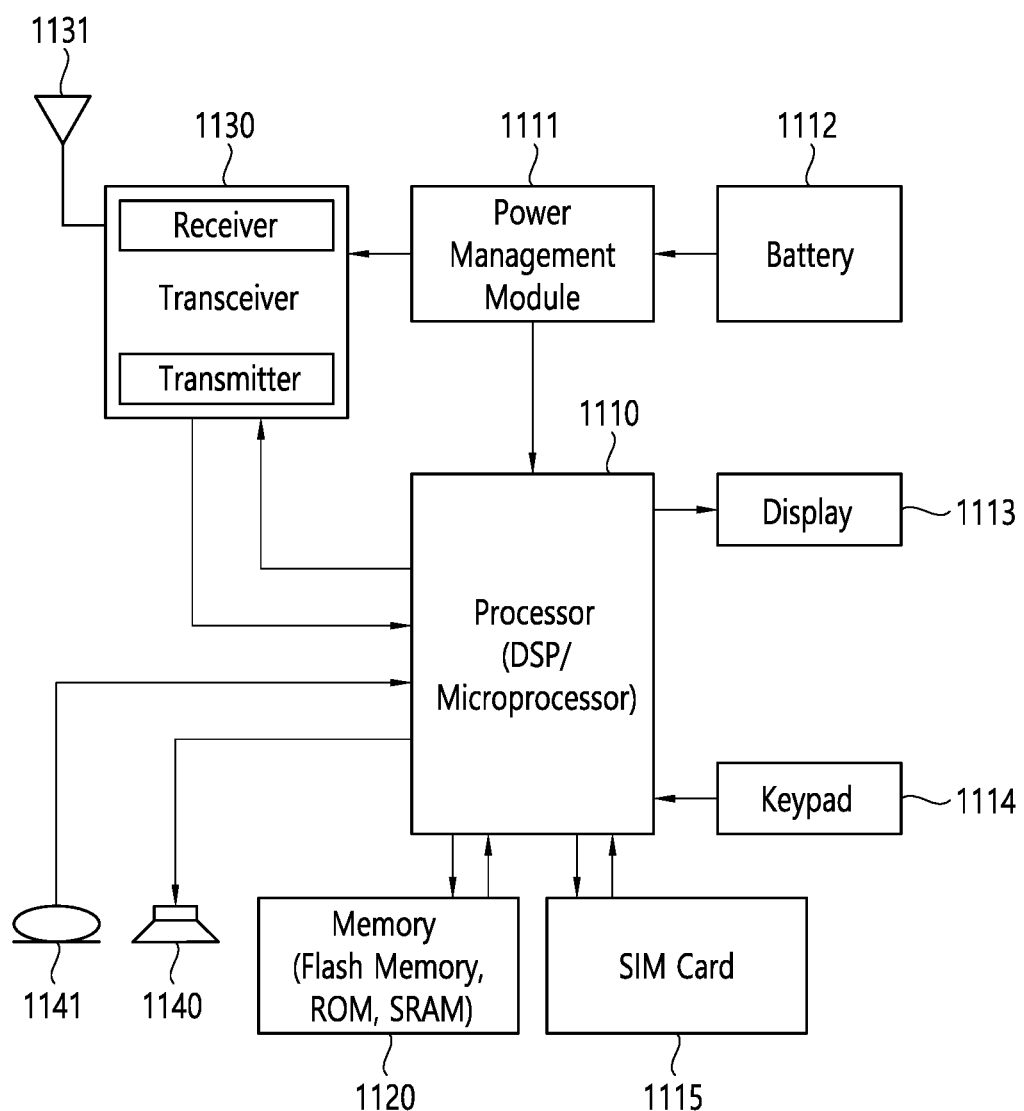
FIG. 11 shows more detailed UE to implement an embodiment of the present invention.

FIG. 11 shows more detailed UE to implement an embodiment of the present invention. The present invention described above for UE side may be applied to this embodiment.

A UE includes a processor 1110, a power management module 1111, a battery 1112, a display 1113, a keypad 1114, a subscriber identification module (SIM) card 1115, a memory 1120, a transceiver 1130, one or more antennas 1131, a speaker 1140, and a microphone 1141.

The processor 1110 may be configured to implement proposed functions, procedures and/or methods described in this description. Layers of the radio interface protocol may be implemented in the processor 1110. The processor 1110 may include ASIC, other chipset, logic circuit and/or data processing device. The processor 1110 may be an application processor (AP). The processor 1110 may include at least one of a digital signal processor (DSP), a central processing unit (CPU), a graphics processing unit (GPU), a modem (modulator and demodulator). An example of the processor 1110 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to an embodiment of the present invention, the processor 1110 may be configured to configure multiple bandwidth parts (BWPs) for a cell. The multiple BWPs may be configured on unlicensed band.

The processor 1110 may be configured to activate a first BWP among the multiple BWPs.

The processor 1110 may be configured to acquire information on congestion of at least one of the multiple BWPs. The information on congestion of the at least one of the multiple BWPs may include information on congestion of the first BWP. The information on congestion of the at least one of the multiple BWPs may include information on congestion of the second BWP. The information on congestion may be acquired by carrier sensing. The information on congestion may inform whether the at least one of the multiple BWPs is busy or free.

The processor 1110 may be configured to switch to a second BWP among the multiple BWPs from the first BWPs, based on the acquired information on congestion. The UE may switch to the second BWP, when congestion level of the first BWP is above a threshold informed by the cell. The UE may switch to the second BWP, when congestion level of the second BWP is below a threshold informed by the cell. The switching to the second BWP may include considering the second BWP as an initial BWP or a default BWP.

Further, the processor 1110 may be configured to perform UL transmission on the second BWP via random access procedure. The processor 1110 may be configured to communicate with at least one of a mobile terminal, a network or autonomous vehicles other than the UE.

The power management module 1111 manages power for the processor 1110 and/or the transceiver 1130. The battery 1112 supplies power to the power management module 1111. The display 1113 outputs results processed by the processor 1110. The keypad 1114 receives inputs to be used by the processor 1110. The keypad 1114 may be shown on the display 1113. The SIM card 1115 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1120 is operatively coupled with the processor 1110 and stores a variety of information to operate the processor 1110. The memory 1120 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 1120 and executed by the processor 1110. The memory 1120 can be implemented within the processor 1110 or external to the processor 1110 in which case those can be communicatively coupled to the processor 1110 via various means as is known in the art.

The transceiver 1130 is operatively coupled with the processor 1110, and transmits and/or receives a radio signal. The transceiver 1130 includes a transmitter and a receiver. The transceiver 1130 may include baseband circuitry to process radio frequency signals. The transceiver 1130 controls the one or more antennas 1131 to transmit and/or receive a radio signal.

The speaker 1140 outputs sound-related results processed by the processor 1110. The microphone 1141 receives sound-related inputs to be used by the processor 1110.

According to embodiments of the present invention, the UE may provide user service on BWP efficiently by moving to non-congested BWP by itself.

The present invention may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 12:
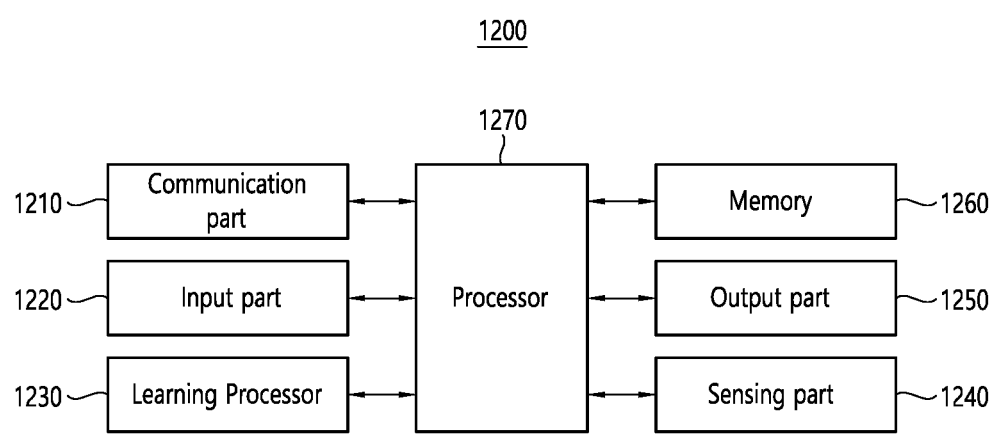
FIG. 12 shows an example of an AI device to which the technical features of the present invention can be applied.

FIG. 12 shows an example of an AI device to which the technical features of the present invention can be applied.

The AI device 1200 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 12, the AI device 1200 may include a communication part 1210, an input part 1220, a learning processor 1230, a sensing part 1240, an output part 1250, a memory 1260, and a processor 1270.

The communication part 1210 can transmit and/or receive data to and/or from external devices such as the AI devices and the AI server using wire and/or wireless communication technology. For example, the communication part 1210 can transmit and/or receive sensor information, a user input, a learning model, and a control signal with external devices. The communication technology used by the communication part 1210 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1220 can acquire various kinds of data. The input part 1220 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1220 can acquire input data to be used when acquiring an output using learning data and a learning model for model learning. The input part 1220 may obtain raw input data, in which case the processor 1270 or the learning processor 1230 may extract input features by preprocessing the input data.

The learning processor 1230 may learn a model composed of an ANN using learning data. The learned ANN can be referred to as a learning model. The learning model can be used to infer result values for new input data rather than learning data, and the inferred values can be used as a basis for determining which actions to perform. The learning processor 1230 may perform AI processing together with the learning processor of the AI server. The learning processor 1230 may include a memory integrated and/or implemented in the AI device 1200. Alternatively, the learning processor 1230 may be implemented using the memory 1260, an external memory directly coupled to the AI device 1200, and/or a memory maintained in an external device.

The sensing part 1240 may acquire at least one of internal information of the AI device 1200, environment information of the AI device 1200, and/or the user information using various sensors. The sensors included in the sensing part 1240 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1250 may generate an output related to visual, auditory, tactile, etc. The output part 1250 may include a display unit for outputting visual information, a speaker for outputting auditory information, and/or a haptic module for outputting tactile information.

The memory 1260 may store data that supports various functions of the AI device 1200. For example, the memory 1260 may store input data acquired by the input part 1220, learning data, a learning model, a learning history, etc.

The processor 1270 may determine at least one executable operation of the AI device 1200 based on information determined and/or generated using a data analysis algorithm and/or a machine learning algorithm. The processor 1270 may then control the components of the AI device 1200 to perform the determined operation. The processor 1270 may request, retrieve, receive, and/or utilize data in the learning processor 1230 and/or the memory 1260, and may control the components of the AI device 1200 to execute the predicted operation and/or the operation determined to be desirable among the at least one executable operation. The processor 1270 may generate a control signal for controlling the external device, and may transmit the generated control signal to the external device, when the external device needs to be linked to perform the determined operation. The processor 1270 may obtain the intention information for the user input and determine the user's requirements based on the obtained intention information. The processor 1270 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1230 and/or learned by the learning processor of the AI server, and/or learned by their distributed processing. The processor 1270 may collect history information including the operation contents of the AI device 1200 and/or the user's feedback on the operation, etc. The processor 1270 may store the collected history information in the memory 1260 and/or the learning processor 1230, and/or transmit to an external device such as the AI server. The collected history information can be used to update the learning model. The processor 1270 may control at least some of the components of AI device 1200 to drive an application program stored in memory 1260. Furthermore, the processor 1270 may operate two or more of the components included in the AI device 1200 in combination with each other for driving the application program.

Figure 13:
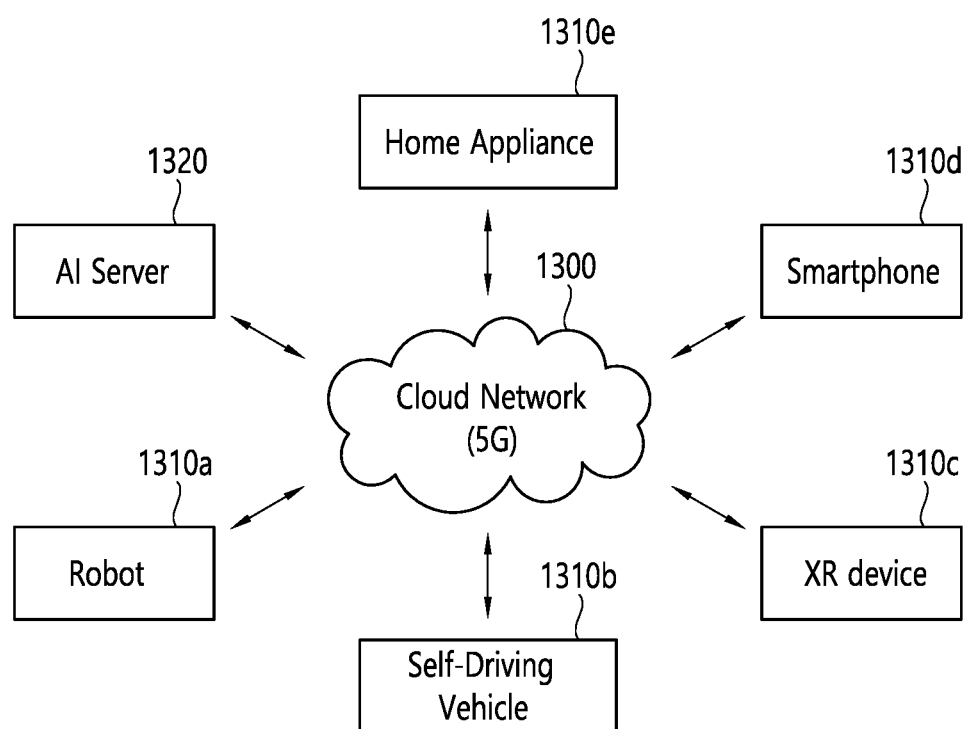
FIG. 13 shows an example of an AI system to which the technical features of the present invention can be applied.

FIG. 13 shows an example of an AI system to which the technical features of the present invention can be applied.

Referring to FIG. 13, in the AI system, at least one of an AI server 1320, a robot 1310*a*, an autonomous vehicle 1310*b*, an XR device 1310*c*, a smartphone 1310*d* and/or a home appliance 1310*e* is connected to a cloud network 1300. The robot 1310*a*, the autonomous vehicle 1310*b*, the XR device 1310*c*, the smartphone 1310*d*, and/or the home appliance 1310*e* to which the AI technology is applied may be referred to as AI devices 1310*a* to 1310*e*.

The cloud network 1300 may refer to a network that forms part of a cloud computing infrastructure and/or resides in a cloud computing infrastructure. The cloud network 1300 may be configured using a 3G network, a 4G or LTE network, and/or a 5G network. That is, each of the devices 1310*a* to 1310*e* and 1320 consisting the AI system may be connected to each other through the cloud network 1300. In particular, each of the devices 1310*a* to 1310*e* and 1320 may communicate with each other through a base station, but may directly communicate with each other without using a base station.

The AI server 1300 may include a server for performing AI processing and a server for performing operations on big data. The AI server 1300 is connected to at least one or more of AI devices constituting the AI system, i.e. the robot 1310*a*, the autonomous vehicle 1310*b*, the XR device 1310*c*, the smartphone 1310*d* and/or the home appliance 1310*e* through the cloud network 1300, and may assist at least some AI processing of the connected AI devices 1310*a* to 1310*e*. The AI server 1300 can learn the ANN according to the machine learning algorithm on behalf of the AI devices 1310*a* to 1310*e*, and can directly store the learning models and/or transmit them to the AI devices 1310*a* to 1310*e*. The AI server 1300 may receive the input data from the AI devices 1310*a* to 1310*e*, infer the result value with respect to the received input data using the learning model, generate a response and/or a control command based on the inferred result value, and transmit the generated data to the AI devices 1310*a* to 1310*e*. Alternatively, the AI devices 1310*a* to 1310*e* may directly infer a result value for the input data using a learning model, and generate a response and/or a control command based on the inferred result value.

Various embodiments of the AI devices 1310*a* to 1310*e* to which the technical features of the present invention can be applied will be described. The AI devices 1310*a* to 1310*e* shown in FIG. 13 can be seen as specific embodiments of the AI device 1200 shown in FIG. 12.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a wireless device configured to operate in a wireless communication system, the method comprising:
   receiving, from a network, a configuration on multiple bandwidth parts (BWPs);
   activating a first BWP among the multiple BWPs as an active BWP;
   comparing a congestion level of the first BWP which is active among the multiple BWPs with a threshold configured by the network, and a congestion level of a second BWP which is inactive among the multiple BWPs with the threshold; and
   based on the congestion level of the first BWP being above the threshold and the congestion level of the second BWP being below the threshold:
   i) autonomously switching an active BWP from the first BWP to the second BWP; and
   ii) initiating a random access procedure on the second BWP.

2. The method of claim 1, wherein the multiple BWPs are configured on an unlicensed band.

3. The method of claim 1, wherein the congestion level of the first BWP is measured based on a carrier sensing on the first BWP.

4. The method of claim 1, wherein the second BWP is an initial BWP or a default BWP.

5. The method of claim 1, wherein the wireless device communicates with at least one of a mobile terminal, a network or autonomous vehicles other than the wireless device.

6. A wireless device configured to operate in a wireless communication system, the wireless device comprising:
   a transceiver;
   at least one processor; and
   at least one memory operatively coupled to the at least one processor and storing instructions that, based on being executed by the at least one processor, perform operations comprising:
   receiving, from a network, a configuration for multiple bandwidth parts (BWPs);
   activating a first BWP among the multiple BWPs as an active BWP;
   comparing a congestion level of the first BWP which is active among the multiple BWPs with a threshold configured by the network, and a congestion level of a second BWP which is inactive among the multiple BWPs with the threshold; and
   based on the congestion level of the first BWP being above the threshold and the congestion level of the second BWP being below the threshold:
   i) autonomously switching an active BWP from the first BWP to the second BWP; and
   ii) initiating a random access procedure on the second BWP.

7. The wireless device of claim 6, wherein the multiple BWPs are configured on an unlicensed band.

8. A processor for a wireless communication device in a wireless communication system,
   wherein the processor is configured to control the wireless communication device to:
   receive, from a network, a configuration for multiple bandwidth parts (BWPs);
   activate a first BWP among the multiple BWPs as an active BWP;
   compare a congestion level of the first BWP which is active among the multiple BWPs with a threshold configured by the network, and a congestion level of a second BWP which is inactive among the multiple BWPs with the threshold; and
   based on the congestion level of the first BWP being above the threshold and the congestion level of the second BWP being below the threshold:
   i) autonomously switch an active BWP from the first BWP to the second BWP; and
   ii) initiate a random access procedure on the second BWP.

* * * * *